Patented May 9, 1950

2,506,964

UNITED STATES PATENT OFFICE 2,506,964

CONTROLLED ELECTRICAL INSTALLATION FOR SUPPLYING ARCS OR OTHER APPLICATIONS

Jean Louis Pierre Gabriel Martin, Paris, France

Application August 8, 1947, Serial No. 767,471
In France May 25, 1946

Section 1, Public Law 690, August 8, 1946
Patent expires May 25, 1966

3 Claims. (Cl. 323—89)

Electrical installations are known for supplying utilization organs such as electric arcs comprising a control organ controlled by the utilization organ and controlling in turn the supply organ.

In such installations variable reactance coils are used acting on the supply organ through a current from a rectifier and varying with the terminal voltage of the utilization unit, variable reactance coils regulating the supply and controlled by said rectifier.

The method is also known of providing such installations with adjustable control units which can be adjusted at will by the operator independently of the action of the utilization unit.

An object of this invention is to improve these installations with a view to allowing the operation of the utilization unit in alternating current.

Electrical installations with a control for the supply of arcs and other applications make it possible to realize the above object, offering the characteristics resulting from the description given below and especially in the appended claims.

Controlled electrical installations for the supply of arcs and other applications according to the invention are represented by way of example on the appended drawings wherein.

Figure 1:
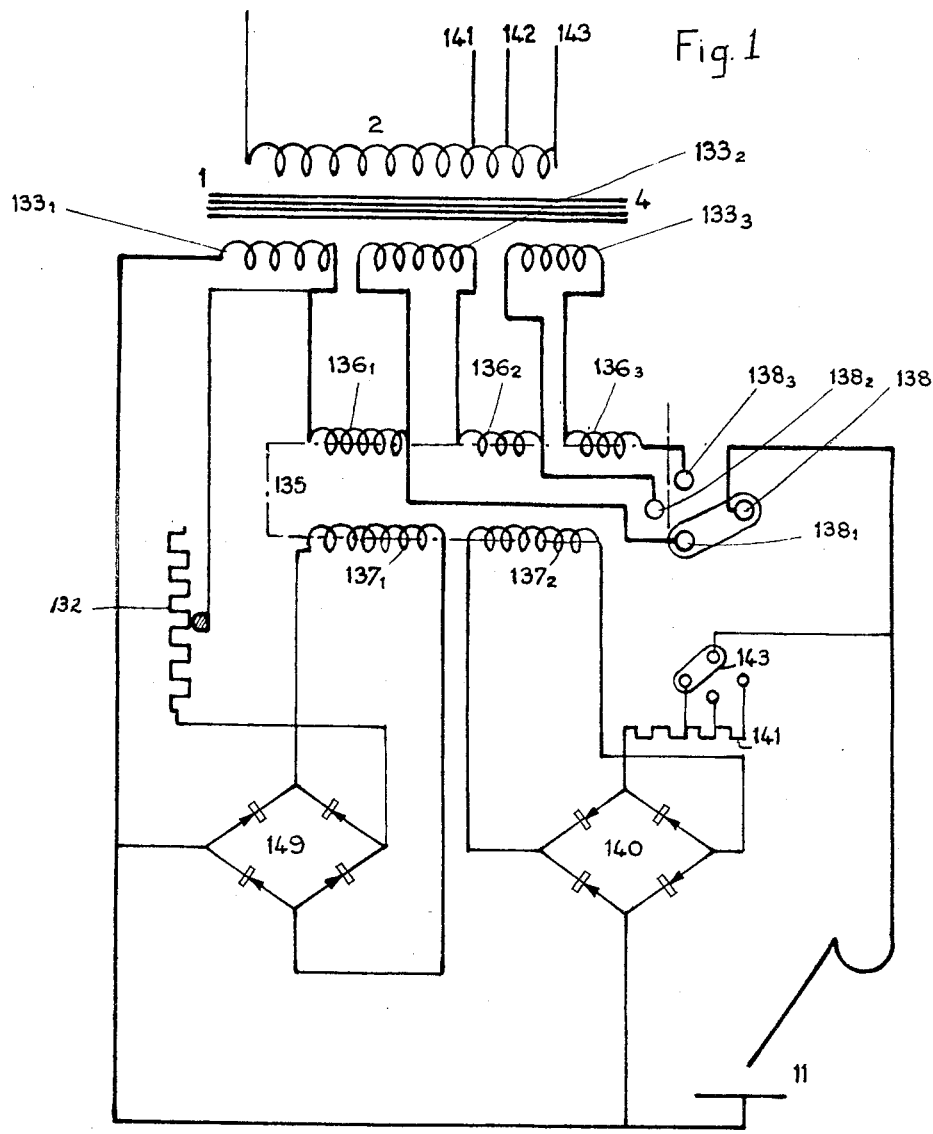
Fig. 1 is a schematic showing of an embodiment of the invention.

The welding apparatus shown in diagram on Figure 1 comprises a supply transformer $1$ with a primary $2$ comprising several taps $141$, $142$ and $143$.

The secondary of this transformer comprises three windings $133^1$, $133^2$ and $133^3$ wound about a magnetic core $4$.

One terminal of winding $133^1$ is directly connected to one of the welding terminals of electrode $11$ while the other terminal is connected through an adjusting coil $136^1$ to a terminal $138^1$ of a switch $138$.

The other terminal of switch $138$ is interconnected with the second welding terminal $11$.

The other secondary coil $133^2$ is connected respectively to the adjusting coil $136^1$ and to a second adjusting coil $136^2$ while the third secondary terminal $133^3$ is connected on one hand to the adjusting coil $136^2$ and on the other hand to a third adjusting coil $136^3$.

The adjusting coil $136^2$ is connected to contact point $138^3$ while the adjusting coil $136^3$ is connected to contact point $138^3$ of the adjusting switch $138$.

To sum up, each one of the secondary windings of the supply transformer $1$ is connected through an adjusting coil $136^1$, $136^2$ or $136^3$ to the respective contact points $138^1$, $138^2$ and $138^3$ of switch $138$.

This switch is mounted in such a way that when its connecting organ is on contact point $138^1$ the secondary winding $133^1$ and the adjusting coil $136^1$ are alone in circuit whereas when the connecting organ is on contact point $138^2$, winding $133^1$ and the secondary winding $133^2$ are mounted in series with their adjusting coils $136^1$ and $136^2$.

Similarly, when the switch is on contact point $138^3$, the three secondary windings $133^1$, $133^2$, $133^3$, are mounted in series with the adjusting coils $136^1$, $136^2$ and $136^3$.

The three adjusting coils $136^1$, $136^2$ and $136^3$ are wound on a magnetic circuit $135$ which may be saturated under the action of a direct current flowing through saturation coils $137^1$, $137^2$.

The saturation coil $137^2$ is supplied through a rectifier $140$ mounted in a Wheatstone bridge receiving its voltage from the terminals of the welding electrodes $11$.

A rheostat $141$ with a contact arm $143$ makes it possible to regulate the alternating voltage applied to the terminals of rectifier $140$.

The saturation coil $137^1$ is supplied with direct current through a rectifier $149$ mounted in a Wheatstone bridge to which is applied the alternating voltage from the secondary winding $133^1$ of the supply transformer $1$.

A rheostat $132$ mounted in series in the supply circuit for alternating current of rectifier $149$ allows the adjustment of the voltage applied to the terminals of this rectifier and thereby of the current supplied by the rectifier into winding $137^1$. It can thus be seen that the adjusting coils made up of variable reactance coils act on the supply voltage under the action of a current which is a function of the voltage at the terminals of the welding electrode $11$ and, similarly, of a current which is a function of the voltage across the terminals of one of the secondaries of the supply transformer $1$.

This arrangement serves advantageously and particularly:

1. To facilitate the ignition of the welding arc.
2. To insure the stability of this arc.

Furthermore, the use of several secondaries $133^1$, $133^2$, $133^3$, which may be connected at will in series with their individual adjusting coil $136^1$, $136^2$, $136^3$, makes it possible to regulate the ignition voltages to the values just necessary for each range of welding. It also makes it possible to bring the short-circuit current to the minimum value for the ignition of the arc.

Thus in the present invention ignition voltages adequately selected and automatically variable are used to facilitate the ignition of the arc.

The device, reacting to the terminal voltage of the arc, improves the ignition conditions by speeding up the build-up of the voltage necessary for the arc after an excess current and particularly after the short-circuit preceding the ignition of the arc.

Also, the device insures the stability of the arc for welding by compelling the voltage to follow immediately the variations of the length of the welding arc and it even allows within wide limits a lengthening of the arc.

This installation makes it possible to obtain a minimum consumption by decreasing the ratio "open circuit voltage" to "voltage underload" and to limit to a strict minimum the cross sections of the winding conductors which decreases the costs.

The operation of the device will be explained more fully in conjunction with the curves shown in Figures 2, 3 and 4, which curves represent the voltage across the terminals of the load as a function of the load current under various circumstances.

Figure 2:
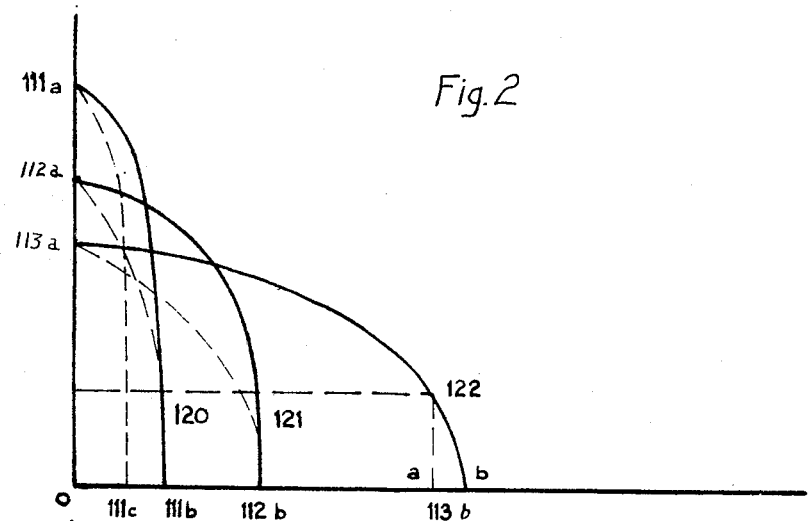
Fig. 2 is a diagram of the family of static curves for the transformer of the installation of Fig. 1, showing the paths of the various starting voltages.

Figure 2 represents the static characteristics, that is the function curves of the device of Figure 1 when the saturation coil $137^2$, saturation of which is a function of the tension at the terminals of the welding electrodes, does not intervene. These curves form three groups of curves, having their tops in the points $111a$, $112a$ and $113a$, respectively and each being enveloped by a broken line border curve and a solid line border curve as shown.

The group enclosed by the border curves $111a$—$111c$ and $111a$—$111b$ represent the function curves when the switch 138 is in position $138^3$, that is when the three secondaries $133^1$, $133^2$, $133^3$ of the transformer 1 with their respective regulating coils $136^1$, $136^2$ and $136^3$ are connected in circuit with the electrodes 11. Likewise, the group of curves enclosed by the border curves $112a$—$111b$ and $112a$—$112b$ represents the function curves, when the switch 138 is in position $138^2$, that is when the two secondaries $133^1$ and $133^2$ with their regulating coils $136^1$ and $136^2$ are connected and the group of curves enclosed by the border curves $113a$—$112b$ and $113a$—$113b$ represent the function curves when the switch 138 in position $138^1$ connects only the secondary $133^1$ and the regulating coil $136^1$.

Which curve of a group of curves is in function is determined by the intensity of the direct current sent through the saturation coil $137^1$ by the rectifier 149; the intensity of this current is in itself controlled by the variable resistance 132. Thus the broken line border curves $111a$—$111c$, $112a$—$111b$ and $113a$—$112b$, respectively, correspond to a zero current in the coil $137^1$ and the solid line border curves $111a$—$111b$, $112a$—$112b$ and $113a$—$113b$ corresponding to a maximum current in the coil $137^1$.

The functioning point may thus be situated between a solid line curve and a corresponding broken line curve, depending on the intensity of the direct current sent through the saturation coil $137^1$.

The functioning points 120, 121 and 122 represent the respective maximum operating welding current intensities. It will be noted that the intensity of the short-circuiting current is appreciably higher than the intensity of the welding current belonging to the same curve. For instance, the normal value $Oa$ of the welding current belonging to the functioning point 122 is much lower than the value $Ob$ of the corresponding short-circuiting current.

Figure 3:
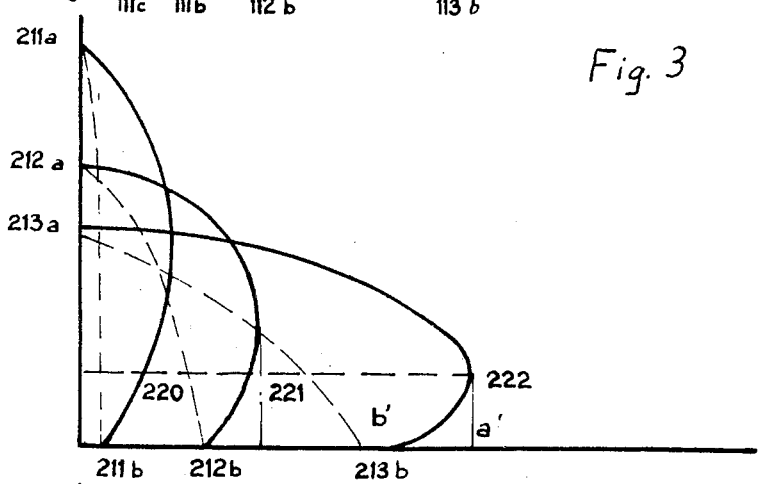
Fig. 3 is a diagram showing the family of dynamic curves for the transformer of the installation of Fig. 1.

Figure 3 represents the diagrammatic characteristics of the device when the saturation coil $137^1$ does not intervene and only the saturation coil $137^2$, of which the saturation current derived from the rectifier 140 is a function of the tension across the load, is made to operate.

Just as in Figure 2, three groups of curves are shown having their tops in the points $211a$, $212a$ and $213a$, respectively, depending on the number of transformer secondaries 133 and regulating coils 136 put in circuit by the switch 138. The broken line border curves $211a$—$211b$, $212a$—$212b$ and $213a$—$213b$ represent the same broken line curves $111a$—$111c$, $112a$—$111b$ and $113a$—$112b$, respectively, of Figure 2, that is in both cases both the coils $137^1$ and $137^2$ are currentless.

The solid border line curves $211a$—$211b$, $212a$—$212b$ and $213a$—$213b$ are the respective function curves when the saturation coil $137^2$ is current fed in dependence of the voltage across the welding electrodes 11, the switch 143 being in its left-hand position as shown in Figure 1.

It will be noted that these curves have a maximum in the direction of the axis of abscissa. This maximum can be readily understood considering the fact that when the electrodes are in contact and cause a short-circuit, the tension at the terminals of the rectifier 140 is nil and therefore the saturation current in coil $137^2$ is nil; the solid line curves thus coincide with their corresponding broken line curves in the points $211b$, $212b$ and $213b$, respectively. In these points the intensity of the short-circuiting current is solely determined by the reactance of the respective regulating coils 136 put in circuit, this reactance having now its maximum value, not being diminished by the action of a saturation current in any of the coils $137^1$ or $137^2$.

When the welding electrodes are separated from one another, the tension at the terminals of said welding electrodes increases so that there appears a certain saturation current in the coil $137^2$, which causes a decrease in the value of the reactance of the respective regulating coils 136. Therefore, when the tension increases the total reactance of the welding circuit decreases, which results in a fast increase in current. This increase occurs until the time when the magnetic circuit of the regulating coils 136 is saturated; from then on the solid line curves tend to approach the corresponding broken line curves until the two again coincide at the points $211a$, $212a$ and $213a$, respectively, where the intensity of the welding current is nil.

As a consequence of all this it will be seen that the welding current intensities at the functioning points 220, 221 and 222, for instance, are appreciably higher than the corresponding short-circuiting current intensities at the points 211b, 212b and 213b, respectively. Especially is this the case at the functioning point 222, having a welding current intensity Oa' as compared with the intensity Ob' of the corresponding short-circuiting current.

As will follow from this, it may happen that the curves of Figure 3, resulting from the functioning of only coil 137², do not provide for a short-circuiting current of sufficient strength to insure a good ignition of the arc. On the other hand, it has been shown by the curves of Figure 2 that when only the saturation coil 137¹ is functioning, the short-circuiting currents may become uselessly strong.

Figure 4:
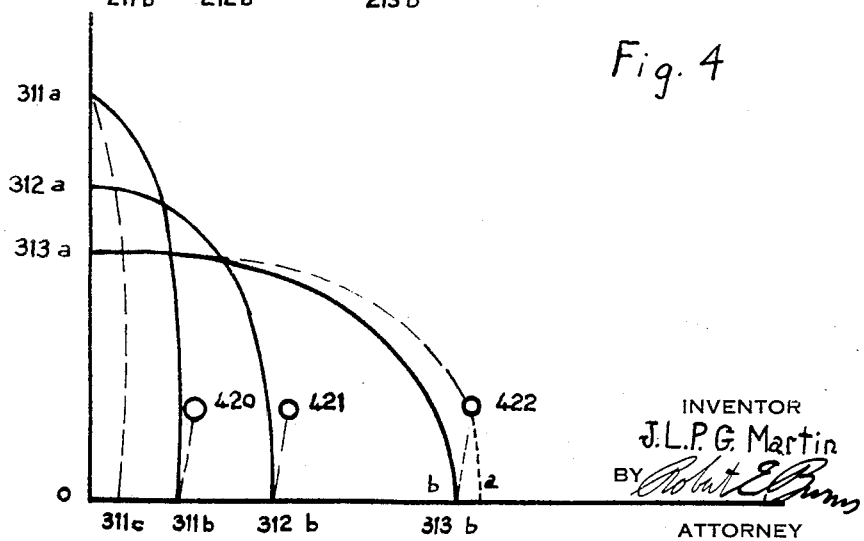
Fig. 4 is a diagram showing the characteristics of the operation resulting from the combinations of the curves in Fig. 2 and Fig. 3.

Figure 4 shows the function of the device of Figure 1 when both rectifiers 149 and 140 are put in operation and therefore direct current is fed to coil 137¹ as well as to coil 137².

The broken line curve 311a—311c corresponds to the broken line curve 211a—211b of Figure 3 and the curve 111a—111c of Figure 2. The solid line curves 311a—311b, 312a—312b and 313a—313b correspond respectively to the static curves 111a—111b, 112a—112b, 113a—113b shown in Figure 2.

The points 420, 421 and 422 indicate the functioning points of the device when there occurs saturation caused by both coils 137¹ and 137². These points are situated outside the solid line curves because the action of the coil 137² is added to the action of the coil 137¹, so that they result from the combination of the corresponding solid line curves of Figures 2 and 3. Thus the welding current intensity Oa at the functioning point 422 can be made equal to or only slightly different from the intensity Ob of the short-circuiting current as determined by the action of coil 137¹. The broken line curve 313a—422—a represents the functioning curve along which the functioning point 422 travels, when the tension at the terminals of the welding electrodes varies. It will be noted that between the points 420 and a, the current has practically a constant value.

The action of the saturation coil 137² is also favorable to the re-ignition of the arc, for at the moment the short-circuit is broken and the arc tends to reappear, the tension growing at its terminals and acting on the coil 137² causes immediately an increase of the voltage through the automatic modification of the reactance of the circuit.

The switches 138 and 141 and variable resistance 132 may be controlled by a single control device, so that the adjustment of the welding current can be effected ampere by ampere from the minimum to the maximum current possible.

What is claimed is:

1. In a controlled electrical apparatus for supplying an arc or other load with alternating current, a supply transformer having separate secondary windings, a saturable reactor with several separate windings, each of said reactor windings being connected in series with one of the secondary windings of the supply transformer, whereby to form a plurality of pairs of windings, said pairs of windings being arranged to permit one of said pairs of windings to be placed in circuit separately and also being arranged to permit one pair of windings to be placed in circuit with at least one other of said pairs of windings, means for placing in circuit at least one of said pairs of windings, said means also being adapted to place at least two of said pairs of windings in circuit in series, a rectifier supplied with alternating current by a voltage which is a function of the voltage across the arc, a saturation coil on the reactor supplied with a direct current from the said rectifier, a second rectifier supplied by the voltage across one of the secondary windings of said supply transformer, a second saturation coil on the reactor supplied by direct current from the said second rectifier, the said saturation coils and separate windings of the said reactor being mounted on the same magnetic core.

2. In a controlled electrical apparatus for supplying an arc or other load with alternating current, a supply transformer having separate secondary windings, a saturable reactor with several separate windings, each of said reactor windings being connected in series with one of the secondary windings of the supply transformer, whereby to form a plurality of pairs of windings, said pairs of windings being arranged to permit one of said pairs of windings to be placed in circuit separately and also being arranged to permit one pair of windings to be placed in circuit with at least one other of said pairs of windings, means for placing in circuit at least one of said pairs of windings, said means also being adapted to place at least two of said pairs of windings in circuit in series, a rectifier supplied with alternating current by a voltage which is a function of the voltage across the arc, a rheostat connected in series in the circuit supplying said rectifier with alternating current, a saturation coil on the reactor supplied with a direct current from said rectifier, a second rectifier supplied by the voltage across one of the secondary windings of said supply transformer, a second saturation coil on the reactor supplied by direct current from the said second rectifier, the said saturation coils and separate windings of the said reactor being mounted on the same magnetic core.

3. In a controlled electrical apparatus for supplying an arc or other load with alternating current, a supply transformer having separate secondary windings, a saturable reactor with several separate windings, each of said reactor windings being connected in series with one of the secondary windings of the supply transformer, whereby to form a plurality of pairs of windings, said pairs of windings being arranged to permit one of said pairs of windings to be placed in circuit separately and also being arranged to permit one pair of windings to be placed in circuit with at least one other of said pairs of windings, means for placing in circuit at least one of said pairs of windings, said means also being adapted to place at least two of said pairs of windings in circuit in series, a rectifier supplied with alternating current by a voltage which is a function of the voltage across the arc, a saturation coil on the reactor supplied with a direct current from the said rectifier, a second rectifier supplied by the voltage across one of the secondary windings of said supply transformer, a rheostat connected in series in the circuit supplying said second rectifier with alternating current, a second saturation coil on the reactor supplied by direct current from the said second rectifier, the said saturation coils and separate windings of the said reactor being mounted on the same magnetic core.

JEAN LOUIS PIERRE GABRIEL MARTIN.

(References on following page)

REFERENCES CITED

The following references are of record in the file of this patent:

UNITED STATES PATENTS

| Number | Name | Date |
|---|---|---|
| 2,004,998 | McCarty | June 18, 1935 |
| 2,175,928 | Steinert | Oct. 10, 1939 |
| 2,179,299 | Murcek | Nov. 7, 1939 |
| 2,278,151 | Runaldue | Mar. 31, 1942 |
| 2,286,727 | Grober | June 16, 1942 |
| 2,295,355 | Prescott | Sept. 8, 1942 |
| 2,310,886 | Wentz | Feb. 9, 1943 |
| 2,322,130 | Hedding | June 15, 1943 |
| 2,409,610 | Bixby | Oct. 22, 1946 |